United States Patent [19]
Soares

[11] Patent Number: 6,034,404
[45] Date of Patent: Mar. 7, 2000

[54] SCHOTTKY-BARRIER SEMICONDUCTOR DEVICE

[75] Inventor: Schubert Francis Soares, Canyon Country, Calif.

[73] Assignee: California Institute of Technology, Pasadena, Calif.

[21] Appl. No.: 08/760,782

[22] Filed: Dec. 5, 1996

[51] Int. Cl.[7] .................................................. H01L 29/82
[52] U.S. Cl. ................................. 257/415; 257/471
[58] Field of Search .................... 257/254, 415, 257/417, 418, 419, 471

[56] References Cited

U.S. PATENT DOCUMENTS

| | | | |
|---|---|---|---|
| 3,590,336 | 6/1971 | Yamashita et al. | 317/234 R |
| 3,786,320 | 1/1974 | Kano et al. | 317/235 R |
| 4,011,577 | 3/1977 | Tanimura et al. | 357/26 |
| 4,408,216 | 10/1983 | Gould | 357/15 |
| 4,586,069 | 4/1986 | Koniger et al. | 357/30 |
| 4,878,253 | 10/1989 | Dixon, Jr. | 455/327 |
| 5,327,075 | 7/1994 | Hashinaga et al. | 324/158.1 |
| 5,359,285 | 10/1994 | Hashinaga et al. | 324/158.1 |
| 5,406,212 | 4/1995 | Hashinaga et al. | 324/760 |
| 5,414,370 | 5/1995 | Hashinaga et al. | 324/760 |
| 5,528,069 | 6/1996 | Mladenovic et al. | 257/417 |

FOREIGN PATENT DOCUMENTS

| | | |
|---|---|---|
| 0 146 212 A1 | 6/1985 | European Pat. Off. . |
| 0 523 729 A1 | 1/1993 | European Pat. Off. . |
| 0 697 738 A1 | 2/1996 | European Pat. Off. . |
| 55-019810 | 2/1980 | Japan . |
| 104755 | 12/1994 | Romania . |
| 1999838 | 11/1976 | U.S.S.R. . |
| 2195791 | 3/1978 | U.S.S.R. . |
| 2191731 | 4/1978 | U.S.S.R. . |
| 2653036 | 6/1980 | U.S.S.R. . |
| 112729 | 2/1985 | U.S.S.R. . |

OTHER PUBLICATIONS

*Photoconductive Gain in a Schottky Barrier Photodiode* by Schubert F. Soares, *Jpn. J. Appl. Phys.* vol. 31 (1992) pp. 210–216.

*Heterodyne Ultraviolet Photodetection* by Schubert Francis Soares, dissertation submitted to University of New Mexico, Albuquerque, NM, Dec. 1989.

*Primary Examiner*—Sara Crane
*Attorney, Agent, or Firm*—Fish & Richardson P.C.

[57] ABSTRACT

A Schottky-barrier sensor has a semiconductor substrate having a pair of metal contacts formed thereon. The contacts form a Schottky barrier at each interface between metal and substrate, and the substrate is mounted on a surface. Strain, temperature and other physical parameters which affect the Schottky-barrier potential can be measured by voltage or current measuring equipment conductively connected to the Schottky-barrier semiconductor device.

31 Claims, 12 Drawing Sheets

SCHOTTKY-BARRIER SEMICONDUCTOR DEVICE

BACKGROUND OF THE INVENTION

The invention relates generally to Schottky-barrier semiconductor devices, and uses therefor. More particularly, the invention is directed to Schottky-barrier semiconductor devices for use in measuring strain, temperature and the like.

Methods are known in the art for measuring mechanical strain, which are based on measurements of resistance, the piezoelectric effect, or the acousto-optical effect. Conventional strain gauges vary in speed, sensitivity, bandwidth, system complexity and cost.

Conventional resistive strain gauges have a conductive element, such as a metal ribbon, epoxied to a flexible member. The gauge is included as a component in a balanced Wheatstone bridge resistive network. The strain produced by vibrations transfers through the flexible member to the metal ribbon and alters its resistivity. This fractional change in the resistivity unbalances the bridge producing a current proportional to the strain. The resistive strain gauge is a narrow band device, responding only in a limited bandwidth in the vibrational spectrum. Dynamic calibration of the bridge is a tedious process and integration in sliding contacts—in which it is desirable to measure strain—requires careful packaging.

Some of the disadvantages of the resistive strain gauge are overcome by using a voltage or capacitive method to measure strain. Certain crystals such as quartz and PZT are piezoelectric in nature. Under stress or strain they become polarized, and the polarization appears as a voltage across the crystal, or alternatively as a capacitive charge. The piezoelectric transducer is packaged in a metal fixture that is mated to the vibrating assembly. The voltage produced by the transducer is amplified electronically. However, sensitive piezoelectric crystals are expensive to fabricate, package, and calibrate. Furthermore, each crystal requires its own calibration.

Strain coupled to an acousto-optic material such as quartz, $LiNbO_3$, or water produces changes in the refractive index of the material. Laser light incident on the material can undergo Bragg diffraction or deflection. The angle of deflection is proportional to the vibrating stimulus, and the deflection is measured on a position-sensitive photodetector array. This is a sensitive method of detecting high frequency vibrations. However, high quality crystals for acoustic sensing are expensive, and the experimental apparatus required for a simple measurement is fairly complex, and unsuitable for measuring strain at multiple locations in a commercial engine, hydraulic system, transmission or the like.

Methods are known in the art for measuring temperature. A common technique used for electrical temperature sensing is to measure the motion of charges in a sensor element. Temperature sensors are commonly constructed as resistors, bi-metal junctions, or semiconductor devices, and require a variety of measurement and calibration techniques.

In resistive temperature sensors, the mean-free path of the electrons between scatter events is related to the temperature. As the temperature increases, the vibratory motion of ions in the resistive material increases, and electrons traveling through the resistive material have a higher scattering probability. The electron mean-free path is reduced and the sensor becomes more resistive. When the temperature declines, the inverse process is true. Resistive sensors often have carbon-glass or metal-film resistors. For example, if aluminum is used as the metal film sensor material, its resistivity changes from 3.55 $\mu\Omega$-cm at 300° K. to 2.45 $\mu\Omega$-cm at 273° K. and 0.3 $\mu\Omega$-cm at 77° K.

Bi-metal junctions are formed when two dissimilar metals make physical contact. A potential barrier is formed at the junctions. Electrons are thermally excited over the barrier, and the current across the barrier is temperature sensitive. Bi-metal thermocouples are most useful at high temperatures.

Semiconductor temperature sensors are usually constructed as p-n junction diodes, bipolar junction or field-effect transistors. The motion of electrons through a crystal is temperature dependent. The crystalline lattice is in a state of vibratory motion in well-defined phonon modes. The phonons scatter electrons randomly. If the temperature of the material is comparable to its Debye temperature, the mode density, governed by Bose-Einstein statistics, is fairly high. The probability of an electron-phonon scatter event is proportionally high, and the electron's mean-free path is relatively short. As the sensor temperature decreases the motion of the crystalline lattice "freezes." Fewer phonon modes are excited in the lattice, and the electron motion is relatively unhindered by any interaction with the lattice. Electrons, may however, undergo Coulomb scattering by a sparse population of impurity ions until the carrier motion itself freezes. This occurs at very low temperatures approaching a few degrees Kelvin.

An alternative technique for temperature sensing in semiconductors is to simply monitor the thermionic emission across the potential barrier in a p-n or a metal-semiconductor junction. The emission probability is proportional to the classical Maxwell-Boltzmann distribution. Sensors using this alternative technique are particularly effective at high temperatures where thermionic emission increases exponentially.

Any of the above-described temperature sensors may be used in a conventional temperature-sensing system as a part of a balanced resistive network powered by a constant-current source. The temperature is measured by monitoring the voltage across a reference resistor held at a fixed temperature. The temperature dependent current through the sensor is deduced from this voltage.

It is known in the art of semiconductor technology that when a semiconductor is brought into contact with a metal, a barrier layer is formed in the semiconductor from which charge carriers are severely depleted. This barrier is known as a Schottky barrier. a Schottky diode is formed in the region where a metal contacts a lightly doped semiconductor. Schottky diodes have a faster response time and lower operating voltage than doped silicon junction diodes. Metal in contact with a highly doped semiconductor ($5 \times 10^{17}$ atoms per cubic centimeter), however, forms a regular ohmic contact. The Schottky barrier forms because the work function of the metal is greater than the work function of the doped semiconductor, and the metal depletes the semiconductor in the region around the contact of charge carriers, typically electrons, leaving in the semiconductor a depletion layer of positively charged donor ions that is practically stripped of electrons.

Semiconductor devices using the Schottky barrier are known in the art. Soares, S. F., "Photoconductive Gain in a Schottky Barrier Photodiode", Jpn. J. Appl. Phys., Vol. 31, pp. 210–216 (1992), discloses a pair of metal contacts on a lightly-doped n-type semiconductor for use in photodetection. At each interface between metal and semiconductor, a Schottky barrier forms. In "Heterodyne Ultraviolet Photodetection" (Dissertation of S. F. Soares, University of New Mexico, Albuquerque, submitted December, 1989), metal contacts are deposited about 3 microns apart on a lightly-doped silicon substrate, and each has an area in contact with the substrate of about 50 square microns to about 250 square microns. The semiconductor dopant density is selected so that the depletion regions of the two contacts almost extend to each other. It is further known that application of a bias across the pair of Schottky barriers enhances the detection of photo events.

There is a need for a simple, inexpensive, fast, robust strain gauge for inclusion in gears and bearings in aircraft engines and transmissions, for example, and engines and transmissions generally. Resistive gauges are difficult to package and time consuming to calibrate. Piezoelectric crystals are expensive and require complex electronic circuits to detect minute stress-induced voltages. Acousto-optic techniques are based on expensive laser techniques.

There is a further need for a temperature gauge for these same engine environments, especially a gauge that can cooperate with a strain gauge, where strain measurements may be thrown off by changes in temperature due to friction or combustion heat from operation.

SUMMARY OF THE INVENTION

The invention is embodied in a novel and useful device for measuring physical variables such as mechanical strain and ambient temperature by directly or indirectly measuring changes which these physical variables impart to Schottky-type electrical barriers in the device.

The device comprises a flexible, lightly-doped semiconductor substrate in the form of a leaf, with at least one metal contact formed on the upper surface thereof, forming a Schottky barrier at the interface of the metal contact and the substrate. More specifically, the device has a pair of metal contacts formed on the upper surface of the substrate for connection to current or voltage measuring equipment, each metal contact forming a Schottky-barrier diode. The Schottky-barrier electrical potential at a metal contact is altered by strain in the substrate leaf, and this electrical potential change is registered in this invention as an indication of that strain. In this manner, the device is a strain gauge.

The electrical potential change can be registered by measuring the current flowing through the Schottky barrier at a metal contact under an external electrical bias. Alternatively, the electrical potential change can be registered by measuring the voltage across the Schottky barrier at a metal contact.

The substrate is preferably formed as a leaf, e.g., sufficiently thin from its upper surface to its lower surface to be flexible. Furthermore, at least one metal contact must interface with the substrate over a sufficiently large area of its upper surface to provide a measurable current or voltage signal indicative of the strain, or of some other physical variable change such as a change of temperature.

The inventive gauge is small, simple, and fast-to-respond. It does not require extensive calibration. It does not require expensive equipment for measuring a response to strain. The range of the device is superior to devices in the art.

The device can be epoxied at its lower surface to an engine part, transmission gear, or any other component, the strain in which is to be measured. Alternatively, the device can be formed by vapor deposition directly on the underlying engine part during fabrication of the part.

Under strain transmitted from the strained engine part, through the epoxy and into the semiconductor substrate, the dopant atoms are redistributed in the semiconductor lattice. The dielectric tensor of the semiconductor substrate is also altered by the strain, producing a bulk polarization across the semiconductor lattice. The Schottky-barrier electrical potential varies as a function of the distribution of the dopant atoms and as a function of the dielectric tensor, so that the changes of these two factors caused by strain likewise causes a change in the Schottky-barrier electrical potential.

The change in electrical potential can be measured directly with voltage measuring equipment connected to the metal contact or contacts, as an indication of the strain. As a preferable alternative, an electrical bias is applied across the Schottky barrier at a metal contact, and the current flow across the barrier is monitored. As the Schottky-barrier electrical potential raises or lowers with strain, the current flow across the barrier is reduced or increased, respectively, as an indication of the strain.

Importantly, the device must be thin enough that strain is adequately imparted from the underlying engine part, for example, through the substrate lattice to the region at the upper surface of the substrate where the Schottky barriers are found. Thinness is also critical because the thinner a device is, the more freely it flexes with the underlying member, without exceeding its elastic limit and fracturing.

The device is formed by a sequence of known semiconductor fabrication techniques. A lightly-doped semiconductor substrate may be directly deposited on an underlying engine part by means of vapor deposition, or a lightly-doped semiconductor substrate may be provided as a prefabricated wafer. At least one metal layer is deposited on a doped semiconductor substrate over an area of sufficient size to provide a measurable change in the Schottky barrier with strain in the substrate. The metal layer is about 30 nanometers thick, and preferably about 5,000 to about 10,000 square microns in area. Preferably, two such metal contacts are formed on the upper surface of the substrate at distinct locations about 1–100 microns apart across the semiconductor substrate surface. For measuring strain, the substrate is thinned down, or deposited, to a thickness of about 10 microns. Additional metal layers may be deposited on the initial metal contact or contacts to provide electrical connectivity to other equipment. Many devices may be created on a single prefabricated wafer, and subsequently cut apart into individual devices.

The overall size of the gauge is about 100 to about 200 microns on a side, making it a very small device, capable of being attached to or embedded in a variety of surfaces in engine, hydraulic or motor components. It can be attached to a surface with an appropriate epoxy. Each of the metal contacts is connected to electrically-conductive leads which permit direct or indirect measurement of the Schottky-barrier potential by measuring equipment, such as ammeters or voltmeters.

Orientation of the gauge with respect to the desirably-measured strain is important in two respects. First, the orientation of the crystal lattice of the semiconductor substrate with respect to the direction of strain is important. Greater sensitivity to a given stress can be obtained in the device if the device is produced and used in a manner such that the anticipated stress occurs in the direction of greatest packing density in the semiconductor lattice of the leaf. Second, the orientation of the two contacts with respect to the crystal orientation is important. It is preferred that a line drawn between the metal contacts is parallel to the direction of greatest packing density in the semiconductor lattice of the leaf.

The device of the present invention can also be used to measure temperature. When a device is subjected to an ambient temperature increase or decrease, the distribution of charge carriers which have sufficient energy to cross the barrier increases or decreases, respectively. With an electrical bias provided across the metal contacts, a change in measured current serves as an indication of temperature change.

A pair of devices can be used in a neighborhood to provide both strain and temperature information about that neighborhood of the underlying engine part. Temperature information can be used to adjust the strain gauge information to compensate for temperature effects within the strain gauge, so that the strain gauge indication is a true indication of underlying strain. In certain engine parts, strain is cyclical, and the strain signal can be deembedded from the combined strain-temperature effects on current flowing across the Schottky barrier.

A pair of devices may also be placed together on the same stressed surface, arranged orthogonally to one another in a Poisson arrangement. Both devices are subject to the same temperature, and therefore produce the same temperature indication, e.g., the same thermionic emission current. However, due to the orthogonal arrangement of the devices, stress in the underlying engine part imparted to the semiconductor leaves of each of the devices results in different currents in each device attributable to the stress. This provides for deembedding the stress signal from the background temperature signal. The stress signal appears primarily in just one device, while the temperature signal appears in both devices. Processing of the signal can yield a corrected value indicative of the stress alone.

Furthermore, a single device can comprise three contacts, arranged in a modified Poisson arrangement in the form of a right-triangular configuration, where the center contact provides a current sink or source. The temperature signal between the center contact and each leg contact is the same. The stress signal is found primarily between just one leg and the contact. This single-chip, modified Poisson arrangement is biased by a Wheatstone bridge circuit. Stress produces current imbalance in the bridge.

The invention provides means for accurately and rapidly measuring strain in engine parts at virtually any location at which these small devices are emplaced. The devices are simple and cheap to construct, robust, and accurate over a broad range.

DETAILED DESCRIPTION OF THE PREFERRED EMBODIMENTS

Figure 1:
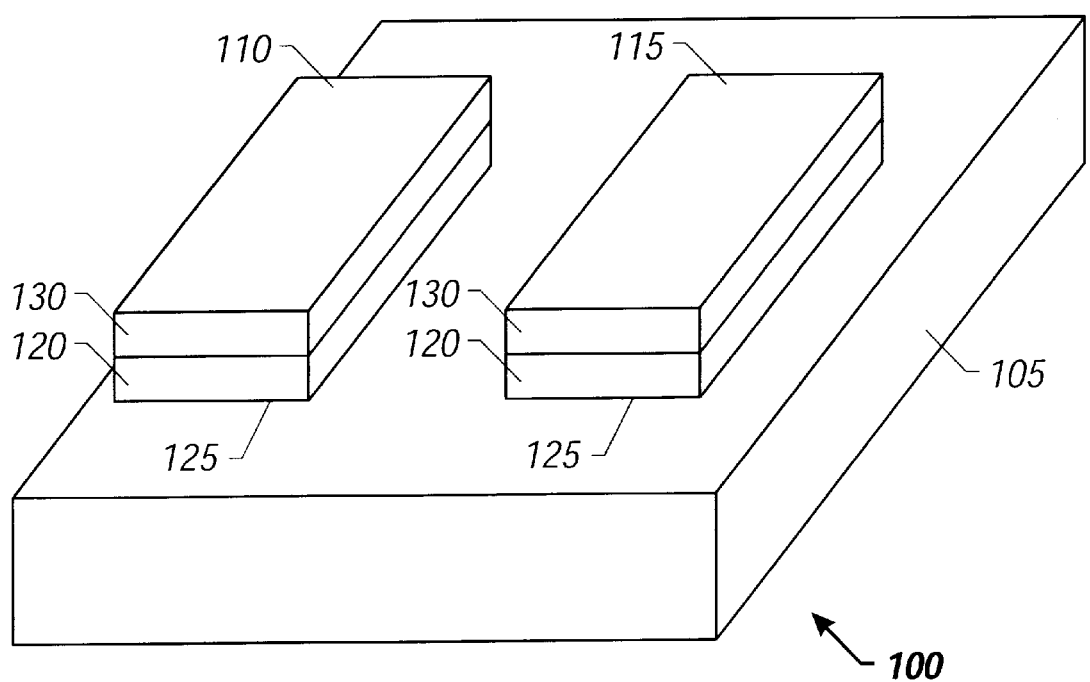
FIG. 1 is a perspective view of a Schottky-barrier strain gauge embodiment of the present invention.

A semiconductor sensor embodying the present invention is shown in FIG. 1, and is generally identified by reference numeral 100. The semiconductor sensor 100 has a lightly-doped semiconductor substrate leaf 105, and a pair of conductive contacts 110 and 115 located thereon. The contacts 110, 115 each comprise a layer of metal 120 at an interface 125 with the semiconductor substrate leaf 105. Additional layers 130 of other suitable metals may rest on top of the initial metal layer 120. The initial metal layer 120 should be chosen to provide a suitable Schottky barrier at the interface 125 to the semiconductor substrate leaf 105 at each contact 110 and 115. The additional metal layers 130 may be chosen to improve conductivity out from the sensor 100 to conductive leads to measuring equipment or the like.

The metal contacts 110, 115 can have a thickness in the range from about 30 nm to about 300 nm, depending on the application of the sensor 100, and whether additional layers of metal 130 are added on top of the initial metal layer 120. Preferably, the metal layer 120 is about 30 nm thick. The lateral separation between the pads 110 and 115 should be in the range of about 1 micron to about 100 microns, and more preferably about 10 microns. Each contact 110 and 115 has an area of about 5,000 to 10,000 square microns, and is approximately 75 to 100 microns on a side, to provide sufficient area of contact with the substrate leaf to obtain a measurable alteration of the Schottky barrier with strain, or with other physical variables.

An important aspect of the sensor in a strain gauge embodiment is that the thickness of the substrate leaf does not dilute the sensitivity of the sensor. For use as a strain gauge, the semiconductor substrate leaf 105 should be thinned to a thickness of about 10 microns, or, if the device is being fabricated directly on the underlying engine part, the substrate leaf 105 should be deposited to a thickness of about 10 microns.

Dilution of sensitivity occurs in two respects. First, strain imparted at the lower surface of substrate through the epoxy from the engine part becomes diluted at greater distances away from the lower surface by relaxation in the crystal lattice of the substrate. The metal contacts and the Schottky barriers formed thereby are at the upper surface of the substrate, and if the substrate is thick, the strain appearing at the upper surface may be a negligible fraction of the strain imparted through the epoxy. Second, the substrate exerts its own resistance to stress upon the underlying strained engine part to which it is epoxied. A thicker substrate exerts a greater resistance to tension or compression, and a greater amount of strain may be lost in the epoxy layer, thereby diluting sensitivity in proportion to the thickness of the substrate.

It is preferable that the substrate leaf 105 be sufficiently thin so that compression or tension communicated through an epoxy or other binder from an underlying engine part to the lower portions of the substrate—thereby causing proportional strain in a bottommost section of the substrate—can be mechanically communicated through a minimal amount of intervening substrate to a upper portions of the substrate, where are found the Schottky-type depletion regions adjacent the metal contacts. Furthermore, a thin leaf-type gauge is preferable because it moves more freely with the tension and compression of the underlying engine part, exerting less of its own resistance to the stress.

If the device is fabricated on a prefabricated semiconductor wafer, and subsequently thinned, it is furthermore preferable to polish the underside of the Schottky strain gauge to a sub-micron smoothness to improve the fracture strength of the substrate.

The substrate leaf 105 may comprise, for example, doped silicon with a dopant concentration on the order of about $10^{15}$ dopant atoms per cubic centimeter. The metal layer 120, forming the Schottky barrier with the silicon substrate, may be nickel, deposited as a layer of 30-nm thickness. Additional layers 130 of chromium and gold may be deposited on top of the nickel, with respective thicknesses of 30 nm and 200 nm. The Schottky-barrier potential of the nickel-silicon interface 125 is about 0.61 eV. The region of carrier depletion in the silicon extends about 1 micron into the silicon substrate 105 from each metal contact 110, 115.

The metal-semiconductor-metal sensor 100 can be used in a variety of applications, including sensing tensile or compressive strain, and measuring temperature.

Figure 2:
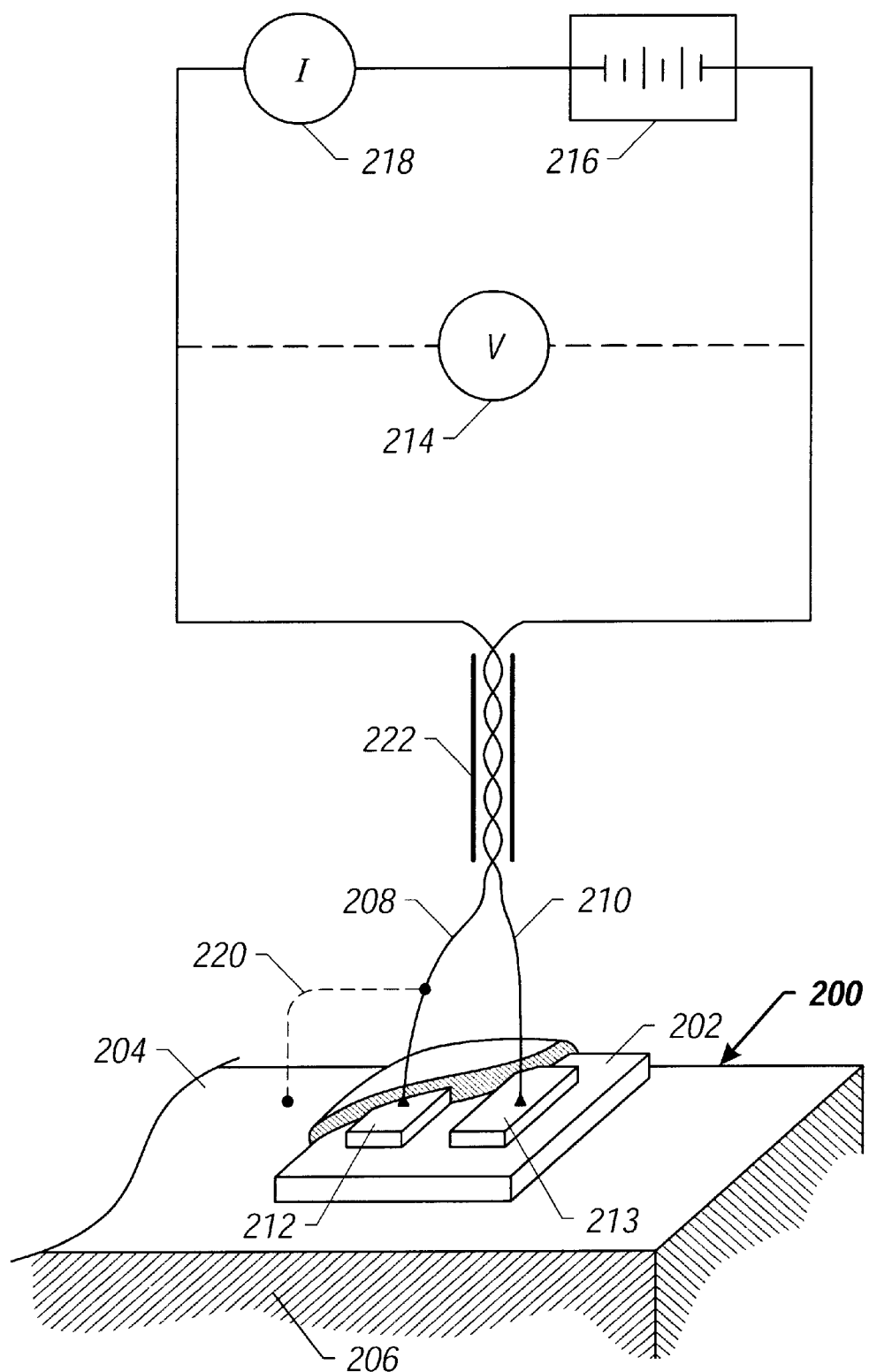
FIG. 2 is a diagrammatic view of the strain gauge shown in FIG. 1 mounted on a surface for measuring strain therein.

As shown in FIG. 2, a metal-semiconductor-metal Schottky-barrier sensor 200 can be employed as a strain gauge. The sensor 200 has a 10-micron-thick lightly-doped silicon substrate 202 in a leaf-like form, which is epoxied with an appropriate epoxy to the surface 204 of a strain-bearing component 206, such as a bearing, gear, cam and crank shaft, hydraulically-pressurized surface, or the like. One suitable epoxy for metal surfaces is, by way of example, Ablestik 789-3 adhesive, available from Ablestik Electronic Materials & Adhesives, in Rancho Dominguez, Calif. Electrically conductive leads 208 and 210 are attached to a pair of contacts 212 and 213 on the substrate 202 using any of a wide variety of well-known conducting arrangements in the art, suitable for the environment in which the sensor 200 is employed. The electrical leads 208 and 210 connect to voltage measuring equipment 214, or in the alternative to a voltage bias source 216 and current measuring equipment 218. Alternatively, one of the electrical leads 208 may terminate at a local ground 220, while the other lead 210 serves as a signal lead. However, improved, low-noise operation is achieved by connecting both leads to shielded cable 222 leading to the signal processing equipment. To protect the connection of the external electrical leads 208 and 210 to the contacts 212 and 213, and to reduce electrical interference or contact with other electrical sources, the gauge 200 can be embedded in an epoxy bead 224, or otherwise packaged according to packaging techniques known in the art.

Metal contacts 212 and 213 may be 30-nm-thick layers of nickel, each covering an area of about 5,000 to about 10,000 square microns of substrate 202. At the interface between each metal contact 212, 213 and the substrate 202, there forms in the substrate a Schottky-type electrical barrier, due to the propensity of the nickel to attract electrons from the semiconductor lattice in the vicinity of the interface.

The strain gauge 200 has several modes of operation. When the substrate is subjected to stress due to the transmission of mechanical stress through the epoxy from the underlying component 206, the ions in the semiconductor lattice are redistributed, producing a two-fold change in the semiconductor substrate 202. The distribution of dopant ions is proportional to the degree of lattice compression or tension. In addition, the dielectric tensor of the semiconductor is reordered in a proportional fashion to the applied stress. A bulk polarization is produced across the stressed crystal of the semiconductor substrate 202. A shift in the potential at each barrier occurs, which varies as a power of the quantity $N_d/\epsilon_s$ (dopant-ion distribution/dielectric constant). The electric field arising from the polarized lattice is distributed across the gauge 200, and appears as a voltage across each contact 212 and 213, which can be measured as an indication of strain. The voltage offset produced is on the order of microvolts and is very susceptible to interference from stray electrical noise sources. The voltage measuring equipment 214 must be very sensitive, and careful electrical measuring techniques known in the art should be employed, since the gauge is not biased.

The electric field also affects the barrier potential, and an alternate mode of operation is to measure the emission current across the metal-semiconductor Schottky-barrier junction at a metal contact under a constant external bias. The external bias 216 can be as simple as a battery, which yields sensitive signals measurable with a pico-ammeter 218 in series with the gauge 200. This mode of operation is preferred as being easier to measure and more stable under an external bias than measuring voltage. A quiescent current level at an applied bias of 5 volts, for example, was approximately 0.8 microamps.

Figure 3:
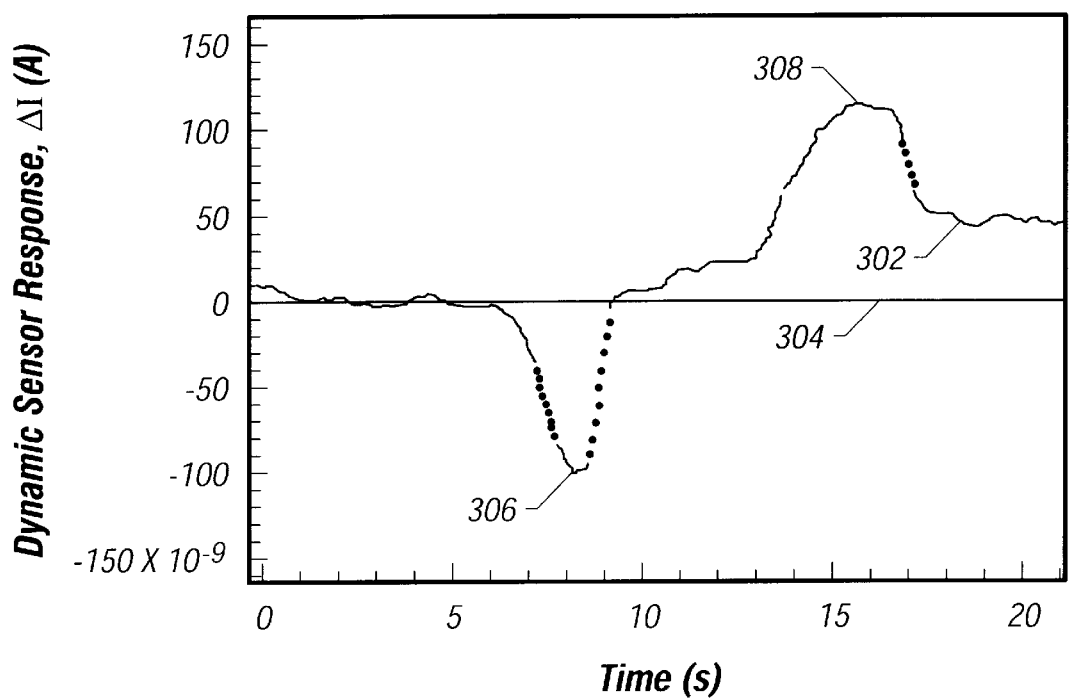
FIG. 3 is a graph of current versus time for the strain gauge shown in FIG. 2, undergoing strain.

An exemplary chart of measured current 302, referenced to such a quiescent level 304, is shown in FIG. 3. Therein is depicted the dynamic sensor response, measured as a change in current with respect to the quiescent current, as a function of time, through which strain was applied. It can be seen that a negative trough 306 in sensor response occurs when tensile stress is applied. A positive peak 308 in sensor response occurs when compressive stress is applied. Thus, as is expected, when a component to which the inventive strain gauge is attached is subjected to stress such that the gauge undergoes tensile strain, the gauge current decreases. When the Schottky strain gauge undergoes compressive stress, the current increases.

It may be appreciated that the device of the present invention must comprise at least one metal contact forming a Schottky barrier in the semiconductor substrate. While it is preferable to provide two metal contacts, as described above, the invention requires only one metal contact which forms a Schottky barrier with the substrate. However, current-measuring and voltage-measuring equipment typically require two conductive inputs, and therefore, whereas one conductive input may be connected to a singular metal contact on a substrate, another conductive lead must be connected to the substrate at another location, essentially forming yet another metal-semiconductor interface. In the embodiment of FIG. 2, having two metal contacts, it may be understood that the application of an electrical bias to the metal contacts 212, 213 effectively forward-biases one of the Schottky-barrier diodes and reverse-biases the other Schottky-barrier diode. The current measurement made thus is indicative of the strain experienced by the reverse-biased Schottky-barrier diode. The device shown in FIG. 2 advantageously provides for an indication of strain in the substrate regardless of which lead 208, 210 is connected to which metal contact 212, 213, since both metal contacts are the same size. However, the invention includes a device having just one metal contact of the requisite size and forming the requisite Schottky barrier with the substrate.

Figure 9:
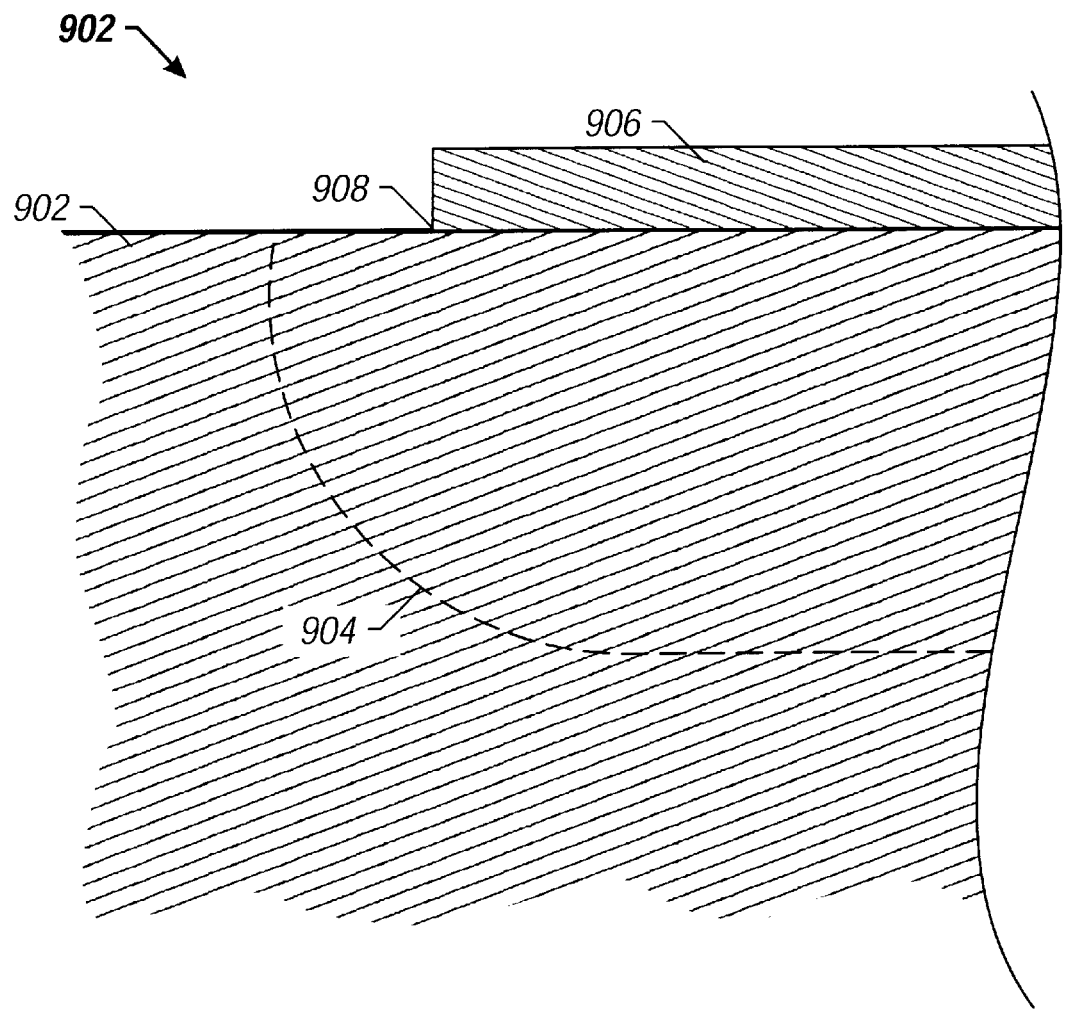
FIG. 9 is a sectional view of the strain gauge shown in FIG. 2.

Turning to FIG. 9, the strain gauge 900 is shown in a sectional view. The dopant density and the dielectric constant are fixed quantities in a semiconductor material of the substrate 902 in mechanical equilibrium, but are modified by strain. The strain redistributes the donor ions within the depletion region 904 of the Schottky-barrier diode at the contact 906. The depletion region 904 at each Schottky-barrier diode exists in a delicate state of charge neutrality between the donor ions in the lattice and the excess electrons that have diffused to the metal contact 906. Under the influence of compressive or tensile stress, the lattice deforms and becomes polarized locally. The polarization is neutralized by free electrons attracted from the metal 906 to the interface just within the depletion region 904 at each Schottky barrier. The Schottky-barrier potential at the interface 908 between nickel and silicon is thus lowered by compressive stress, resulting in larger emission current flow under external bias. Tensile stress tends to reduce the bulk polarization in the depletion region 904, and electrons from the semiconductor substrate 902 are relinquished by diffusion to the metal 906. As a result, tensile stress reduces emission current flow under external bias. The Schottky-barrier potential is extremely sensitive to local charge distributions, and rises accordingly, reducing the emission current flow across the barrier under external bias.

Figure 4:
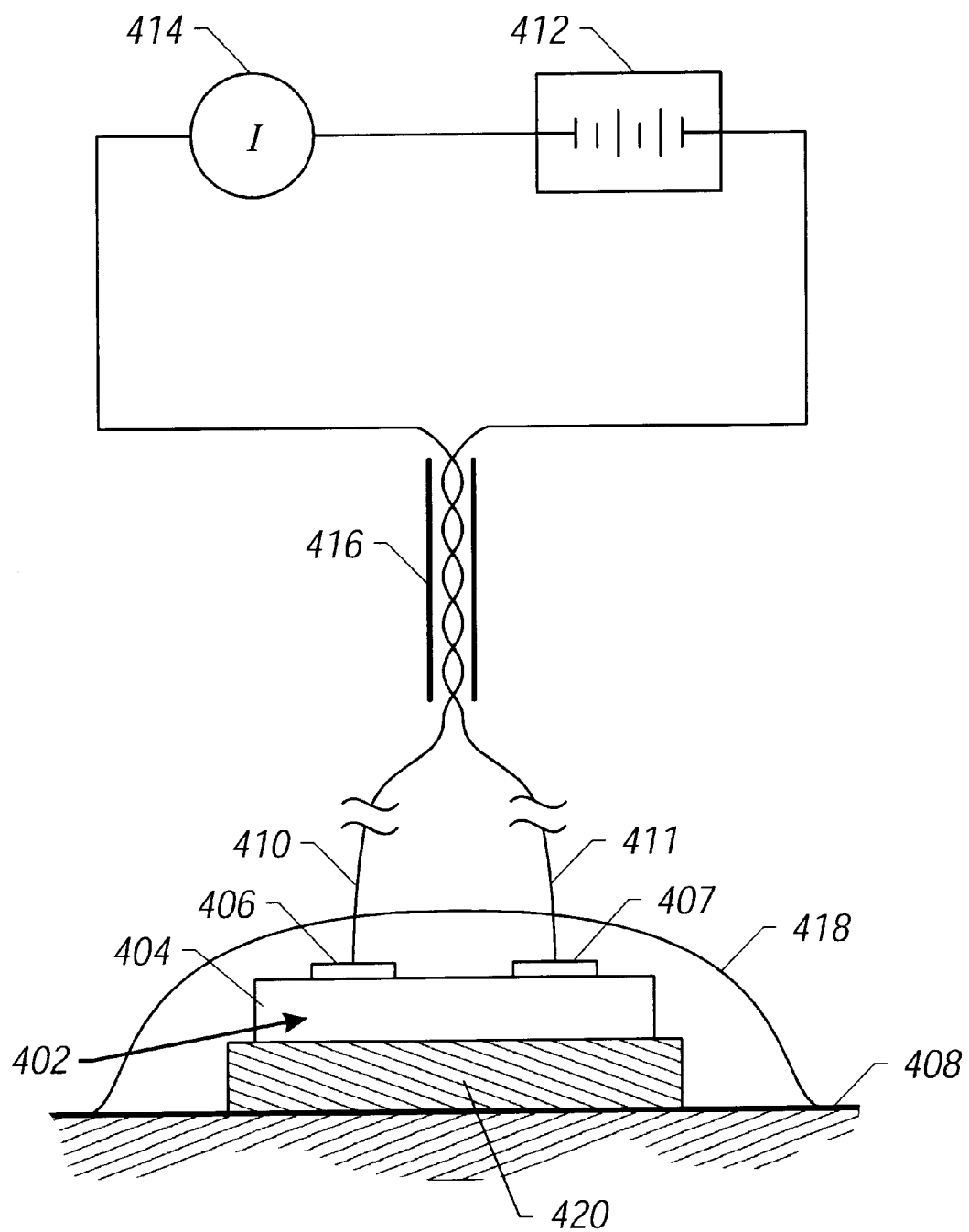
FIG. 4 is a diagrammatic view of a Schottky-barrier temperature sensor of the present invention.

The semiconductor sensor of the present invention may also be used as a temperature sensor according to the following way, as depicted in FIG. 4. A Schottky-barrier temperature sensor 402 has a lightly-doped silicon substrate 404 and two metal contacts 406 and 407 thereon, and can be epoxied to a surface 408 in a vicinity in which it is desired to measure temperature. The metal contacts 406 and 407 can be nickel, by way of example, or any other suitable metal which forms Schottky barriers when deposited onto the doped silicon substrate 404. The contacts 406 and 407 preferably have a thickness of about 30 nanometers, and cover an area of about 5,000 to 10,000 square microns. Electrically conductive leads 410 and 411 are connected from the pads 406 and 407, and connect to a biasing circuit 412 and a low-noise pico-ammeter 414 in series. To improve the low-noise quality of the sensor, shielded cable 416 can be used for the leads 410, 411 from the contacts. To protect the Schottky temperature sensor 402, it may be embedded in an epoxy bead 418, or otherwise packaged according to packaging techniques known in the art. The silicon substrate material can be directly bonded to a variety of conductive and nonconductive mechanical parts without the need for a special insulating backing. However, if desired, insulating material 420 may be added to the underside of the semiconductor substrate 404 where appropriate in attaching the sensor to a surface 408.

Figure 5:
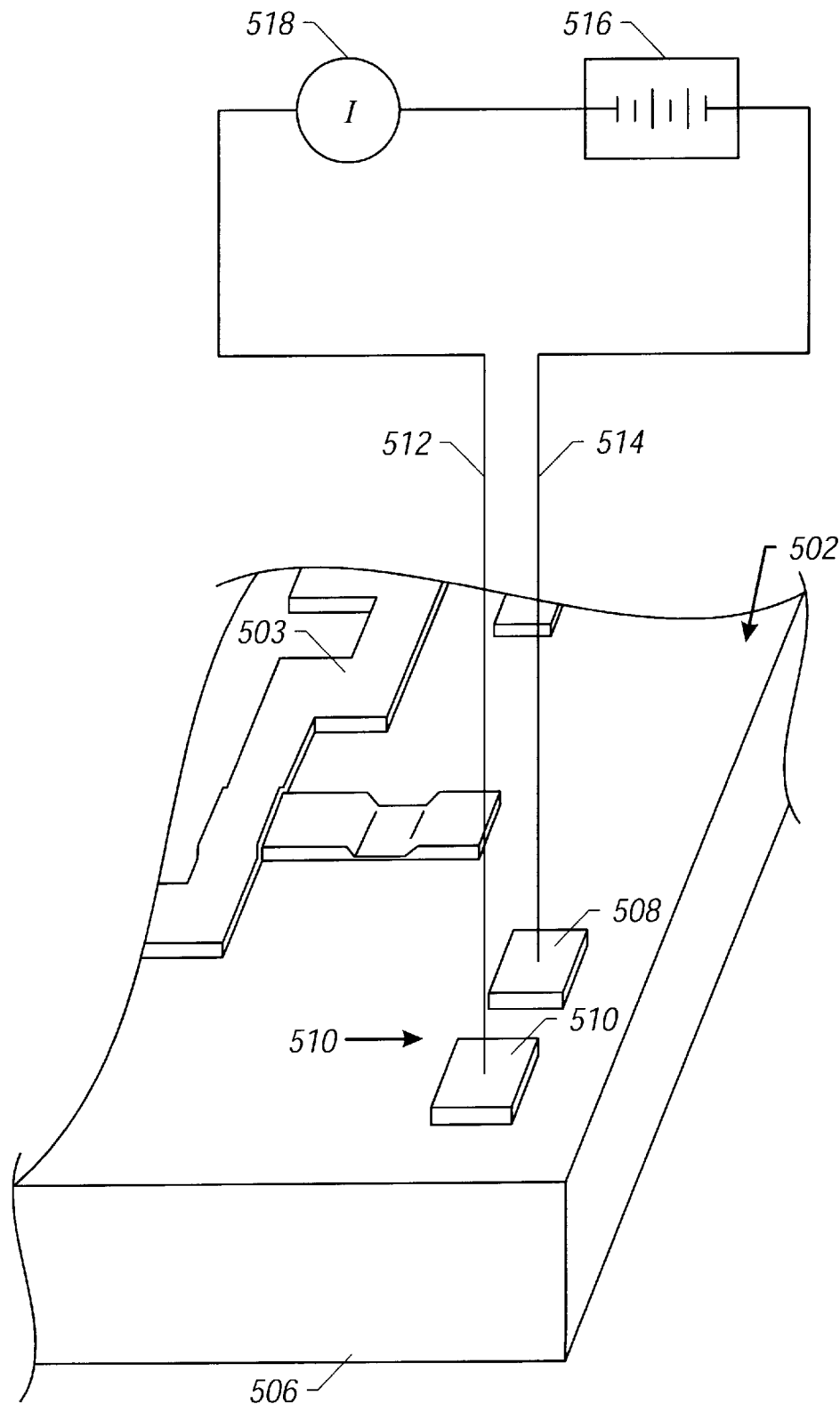
FIG. 5 is a perspective view of an alternative embodiment of the temperature-sensing Schottky device.

In an alternative embodiment, as shown in FIG. 5, a Schottky temperature sensor 504 is used to measure the temperature of an integrated circuit die 502 having an electronic circuit 503 formed thereon. The Schottky sensor 504 is fabricated on the die 502 upon which the circuit 503 is being constructed, by fabrication techniques known in the art and fabrication techniques described elsewhere in this specification. The metal contacts 508 and 510 are deposited with the dimensions herein specified, namely a thickness of about 30 nm and an area of about 5,000 to about 10,000 square microns. Measurements of current are taken via conductive leads 512 and 514 which lead to a simple bias circuit 516 and ammeter 518 in series. In this embodiment, the circuit die 502 is a doped semiconductor, and serves as the substrate for contacts 508 and 510, which form the requisite Schottky barriers in the die 502, as described above.

As another alternative, a Schottky temperature sensor of the present invention can be embedded within a component, to obtain its bulk temperature.

When the symmetric metal-semiconductor-metal Schottky-barrier diode arrangement is in thermal equilibrium, electrons in a continuum of states in the semiconductor and metals have energies described by the Maxwell-Boltzmann distribution. Thermally emitted electrons (thermionic emission current) near the interface between the metal contacts and the substrate have energies distributed over a range. Some electron energies are large enough to overcome the Schottky-barrier potential at each metal contact, whereas some electrons do not have sufficient energy. As the temperature at the Schottky-barrier diode junction increases, larger numbers of electrons have sufficient energy to cross the Schottky barrier at a metal contact. When the temperature drops, proportionately fewer electrons have the necessary energy to cross the barrier. Electrons at both Schottky barriers in the device, and on either side of each barrier can overcome the barrier with sufficient energy.

Currents arising from thermionic emission move in opposite directions across the barriers. The net resultant current is zero if the sensor is unbiased. Thermionic electrons must move in one direction to constitute a current which is measurable and which may vary as a function of temperature. Unidirectional current may be accomplished by applying an external bias voltage from the biasing circuit 412 or 516, such that the external bias voltage is greater than the "flat-band" voltage of the diodes. The "flat-band" voltage is the bias point threshold at which the applied electric field forces charges to move unidirectionally across the metal-semiconductor-metal diode pair.

The temperature-dependent current established by the biasing can be measured by a series pico-ammeter, such as 414 and 518. The current j(T) varies with temperature T according to:

$$J(T) \sim \exp[-e\phi_{SB}/kT],$$

where $\phi_{SB}$ is the potential energy of the Schottky barrier, k is the Boltzmann constant, and T is the temperature.

Figure 6:
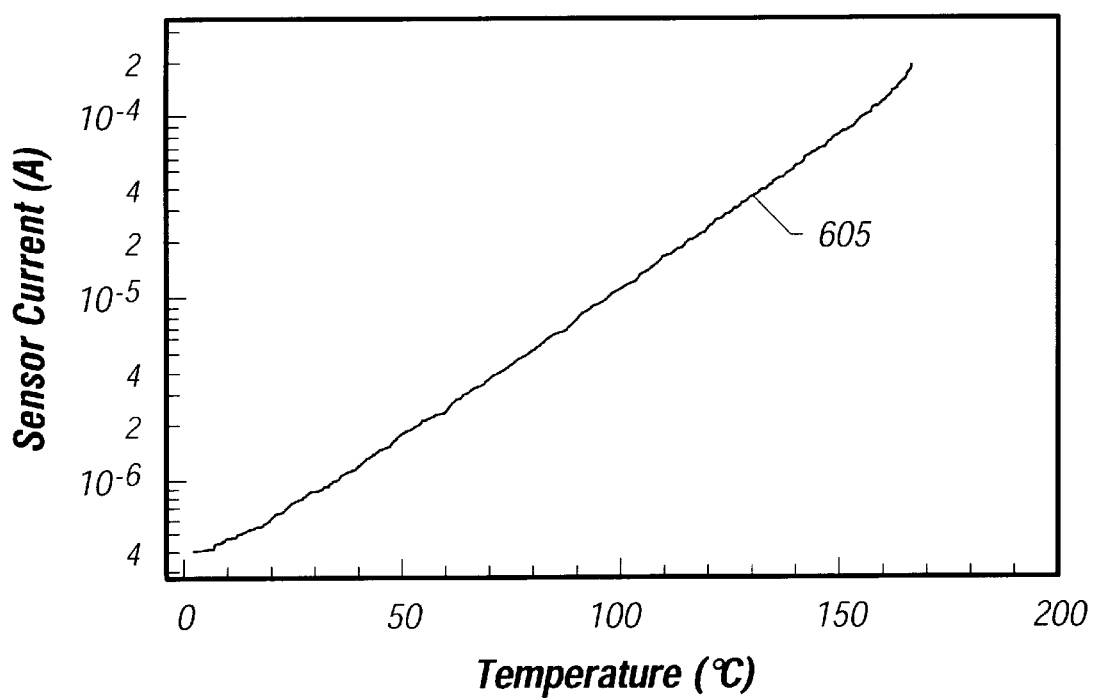
FIG. 6 is a graph of current versus temperature of the Schottky device.

By way of example, FIG. 6 shows a response 605 of the thermionic emission current to changes in temperature, for a nickel-silicon-nickel device (the preferred embodiment of the temperature sensor) having a 20-micron separation between contacts, each contact being 75 microns wide and 100 microns long, under a bias of 2 volts, and where the quiescent current at room temperature was about 0.5 microamps. The response is measured as emission current as a function of temperature.

The Schottky temperature sensor performs well for temperatures below 500° C., and is particularly suitable for applications where the temperature is between 0° C. and 100° C. Use of the Schottky temperature sensor at temperatures above approximately 500° C. may result in annealing of the silicon and nickel layers to form highly resistive nickel silicide, which impairs electron emission. The small physical size of the Schottky sensor makes it particularly appealing for sensing of localized temperature in a sliding bearing surface, and provides very rapid response to thermal fluctuations due to the low thermal mass and relatively large surface area.

The semiconductor temperature and strain sensors of the present invention may be fabricated according to well-known methods in the art. A doped silicon wafer of 0.5 mm thickness and 2-inch diameter, which is widely available in the semiconductor fabrication marketplace, having a dopant concentration of about $10^{15}$ dopant atoms per cubic centimeter, may be used as a substrate for the sensor. The silicon wafer is first cleaned in a solution of $H_2O_2$ and $H_2SO_4$ in proportions of 1:3, respectively, for five minutes. It is then rinsed in de-ionized water and dried in a nitrogen atmosphere. The wafer is then spin-coated with a 3-micron layer of photoresist and subjected to a 100° C. prebake. It is then exposed to 350-nm ultraviolet light through a chrome-emulsion mask having the desired device pattern. The mask for a 2-inch silicon wafer may have a multitude of device patterns, each having two contacts spaced from 1 to 100 microns apart, where each contact is about 75 microns wide along the dimension perpendicular to a line dividing the contacts, and about 100 microns long along the dimension parallel to the line dividing the contacts. The exposed wafer is then soaked in chlorobenzene to assist in the process of lift-off. The wafer is then developed and subjected to a 100° C. postbake. The wafer is coated with a 30-nm layer of nickel, a 30-nm layer of chromium, and a 200-nm layer of gold in an electron beam evaporator. Thereafter, soaking in acetone causes removal of the unexposed photoresist and removal of the unused areas of metal. The wafer may then be diced into individual dies each having a pair of Ni—Cr—Au contacts. At all times process temperatures should be kept under 200° C. to assure that stable Schottky contacts are formed at the interface between silicon substrate and nickel.

Finally, to enable the device to be used for the measurement of strain, the devices may be thinned down to a thickness of about 10 microns, and polished on the underside of the silicon substrate. It is preferable that the underside be polished to a sub-micron smoothness to improve fracture strength.

As mentioned above, it is contemplated to use the semiconductor device of the present invention for measurement of strain or temperature. In the measurement of strain, it has been noted in the above description that the strain gauge is also subject to variations in emission current from temperature fluctuations as well as from the strain sought to be measured, and in order to compensate for the temperature fluctuations, a temperature sensor can be placed in the vicinity of the strain gauge, and its output used to compensate for thermal fluctuations in the current response of the strain gauge. In the measurement of large strain, the temperature signal is negligible compared to the strain signal. It is contemplated that the temperature sensor of the present invention can be used in combination with the strain gauge of the present invention to provide a measure of strain and temperature together, where desirable. Alternatively, the strain gauge of the present invention can be used with any temperature sensor known in the art, to provide a temperature-corrected measure of strain.

Figure 7:
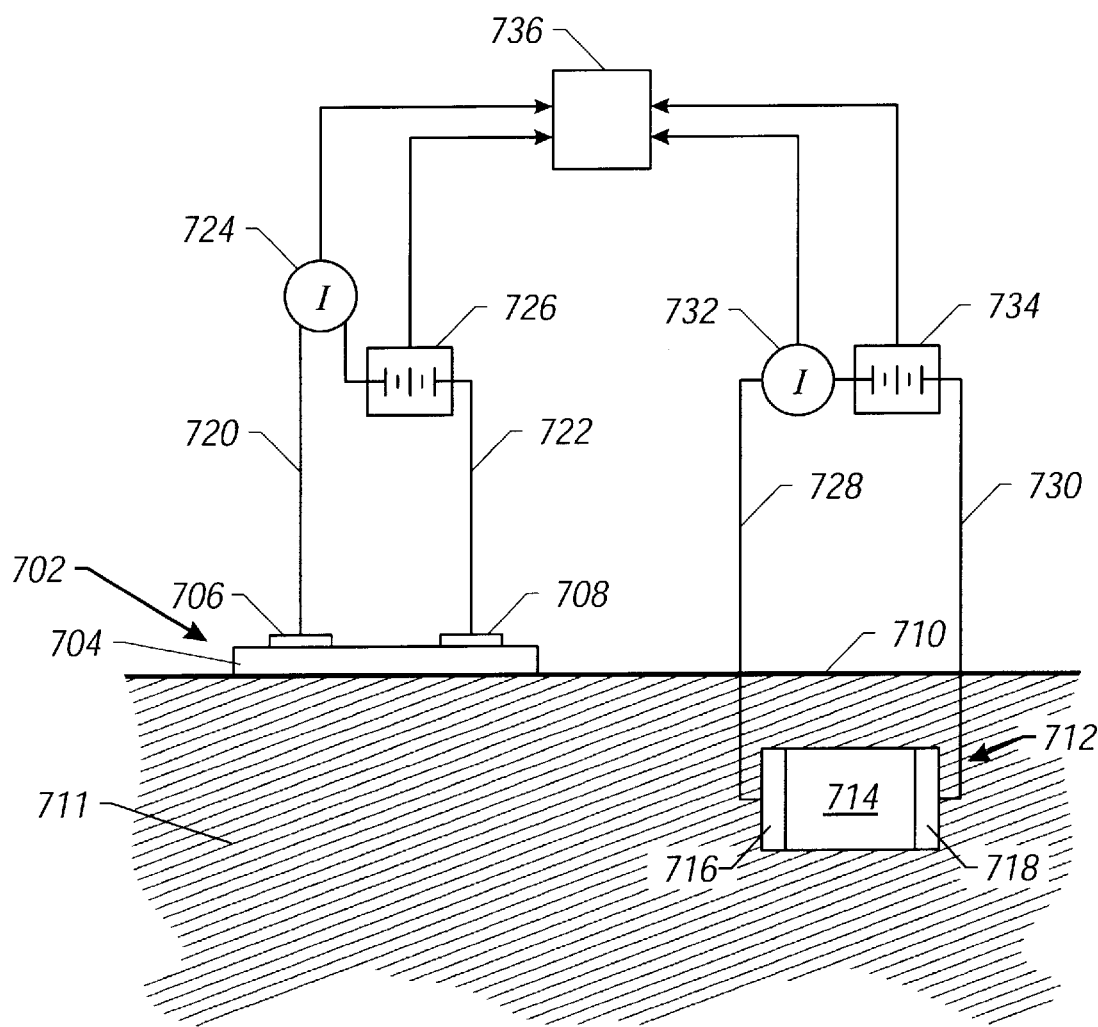
FIG. 7 is a diagrammatic view of another Schottky-barrier strain gauge of the present invention.

For example, as shown in FIG. 7, a Schottky strain gauge 702 according to the present invention, comprising a substrate 704 and a pair of metal contacts 706 and 708 may be epoxied to a surface 710 of a component 711 for strain measurements, while a temperature sensor 712, comprising a semiconductor substrate 714 and a pair of metal contacts 716 and 718 according to the present invention can be embedded marginally deeper in a non-flexing region of component 711, so as to be shielded from surface stress, even while supplying temperature information for de-embedding the strain signal from the strain gauge. Leads 720 and 722 conductively connect from the metal contacts 706 and 708 of the strain gauge 702 to an ammeter 724 and biasing circuit 726 in series. Leads 728 and 730 conductively connect from metal contacts 716 and 718 of temperature sensor 712 to another ammeter 732 and biasing circuit 734 in series to provide measurement of temperature. Information on measurement of current indicative of strain combined with some temperature effects can be provided to a processor 736 from ammeter 724 and biasing circuit 726. Information on measurement of current indicative of mostly temperature alone can be provided to the processor 736 from ammeter 732 and biasing circuit 734. The processor can be hardwired or programmed according to known methods in the art to provide an output indicative of the strain alone based on the combined inputs of the strain gauge and temperature sensor.

It is further contemplated that where a strain gauge is used on an underlying engine part which experiences cyclical strain, the processor 736 can be used with strain gauge 702 alone. The processor 736 can be programmed or hardwired to deembed the temperature-corrected strain from the measured current from ammeter 724 (which indicates both strain and temperature effects) by filtering out the constant temperature effect from the time-varying strain effect.

Figure 10A:
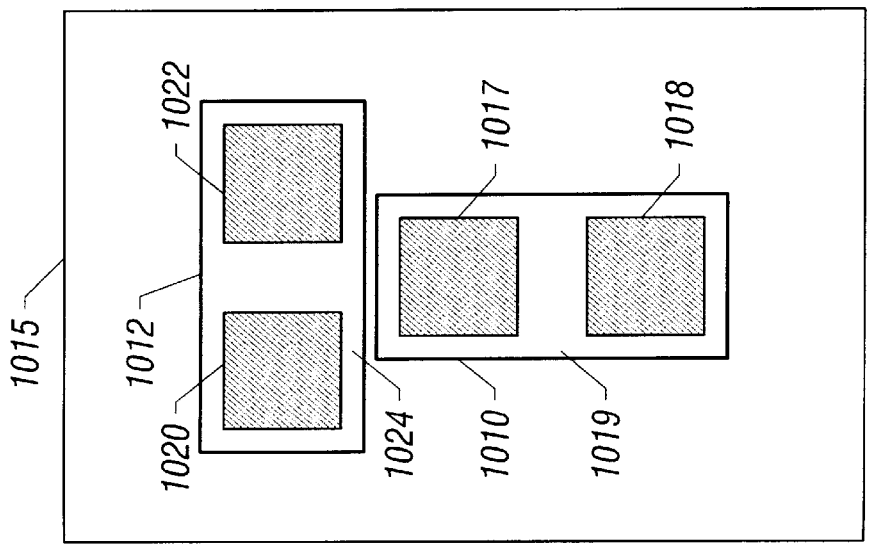
FIG. 10A is a top view of another Schottky-barrier strain gauge of the present invention.
Figure 10B:
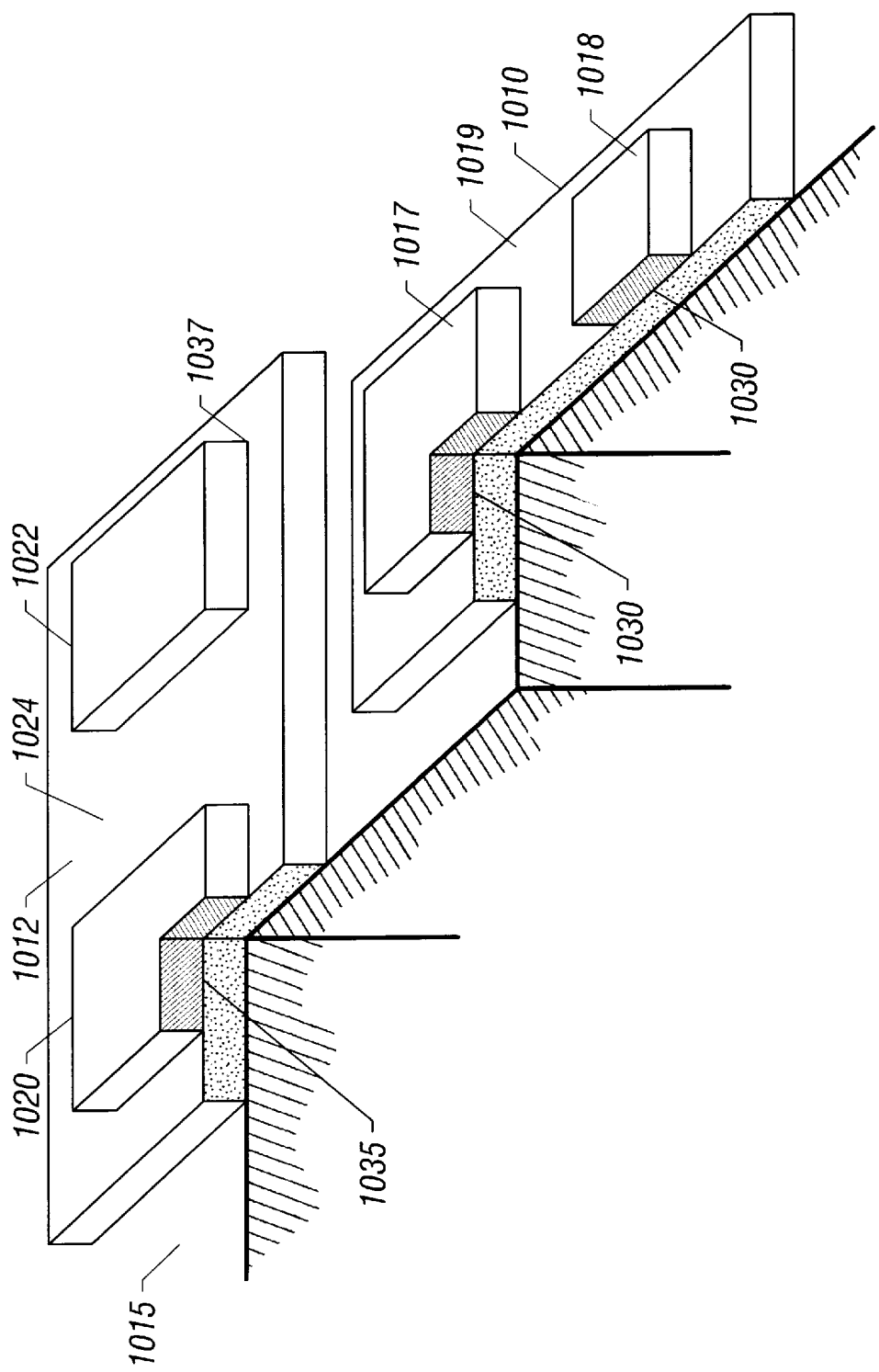
FIG. 10B is a partially sectional view of the Schottky-barrier strain gauge of FIG. 10A.

As an alternative to embedding a temperature sensor within the component, as shown in FIG. 7, a pair of Schottky-barrier gauges 1010, 1012 can be arranged on the surface 1015 of a component in the orthogonal arrangement shown in FIGS. 10A and 10B. This arrangement also provides for temperature correction of strain measurements.

Gauge 1010 has metal contacts 1017 and 1018 on a semiconductor leaf 1019. Gauge 1012 has metal contacts 1020 and 1022 on a semiconductor leaf 1024. Metal contacts 1017, 1018, 1020 and 1022 may comprise one or more layers of different metals, as described hereinabove with respect to the device of FIG. 1. Each semiconductor substrate leaf 1019, 1024 preferably has a thickness of about 10 microns. Each metal contact 1017, 1018, 1020 and 1022 preferably has an area in the range of about 5,000 to 10,000 square microns, and is approximately 75 to 100 microns on a side. Metal contacts 1017 and 1018 are preferably about 1–100 microns apart across the surface of the substrate leaf 1019, and metal contacts 1020 and 1022 are similarly spaced apart across the surface of substrate leaf 1024.

Schottky barriers are formed at the interfaces 1030, 1033, 1035 and 1037 between metal contact 1017 and leaf 1019, metal contact 1018 and leaf 1019, metal contact 1020 and leaf 1024, and metal contact 1022 and leaf 1024, respectively. Metal contacts 1017 and 1018 are connected to an electrical bias, such that electrical current flows between them. Similarly, metal contacts 1020 and 1022 are connected to an electrical bias, causing current to flow therebetween as well.

Gauges 1010 and 1012 preferably have substantially similar dimensions, and thus yield the same temperature-dependent thermionic emission signal. However, gauges 1010 and 1012 may be of dissimilar size, in which case they may yield differing thermionic emission signals at the same temperature. The size-dependent temperature response of the gauges may be correlated to one another, such that if a temperature change occurs, resulting in a change in thermionic emission current in, by way of example, gauge 1012, an estimate may be made of exactly how much the thermionic emission current in gauge 1010 must change, other parameters being constant.

Gauges 1010 and 1012 are preferably fabricated such that the orientation of the lattice of the semiconductor leaf 1019 with respect to a hypothetical line connecting metal contacts 1017 and 1018, is the same as the orientation of the lattice of the semiconductor leaf 1024 with respect to a hypothetical line connecting metal contacts 1020 and 1022. Therefore, with the gauges 1010 and 1012 arranged as shown in FIG. 10A, the orientation of the lattices of semiconductor leaves 1019 and 1024 are orthogonal. A directed stress applied to the underlying surface 1015 and transmitted to the semiconductor leaves 1019 and 1024, will result in different redistributions of dopant ions in the leaves, as well as a different reordering of the dielectric tensor in each.

With the application of directional compression or tension, a stress-generated signal appears in one of the gauges, gauge 1012 by way of example, which is substantially absent in the other gauge, gauge 1010. Since the temperature signal is the same across both gauges, the strain signal can be easily deembedded from the overall current signal coming from gauge 1012, utilizing the temperature signal coming from gauge 1010.

Figure 11A:
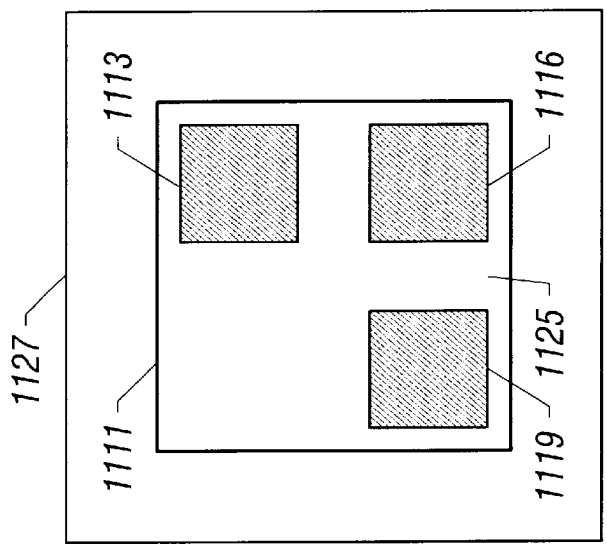
FIG. 11A is a top view of another Schottky-barrier strain gauge of the present invention.
Figure 11B:
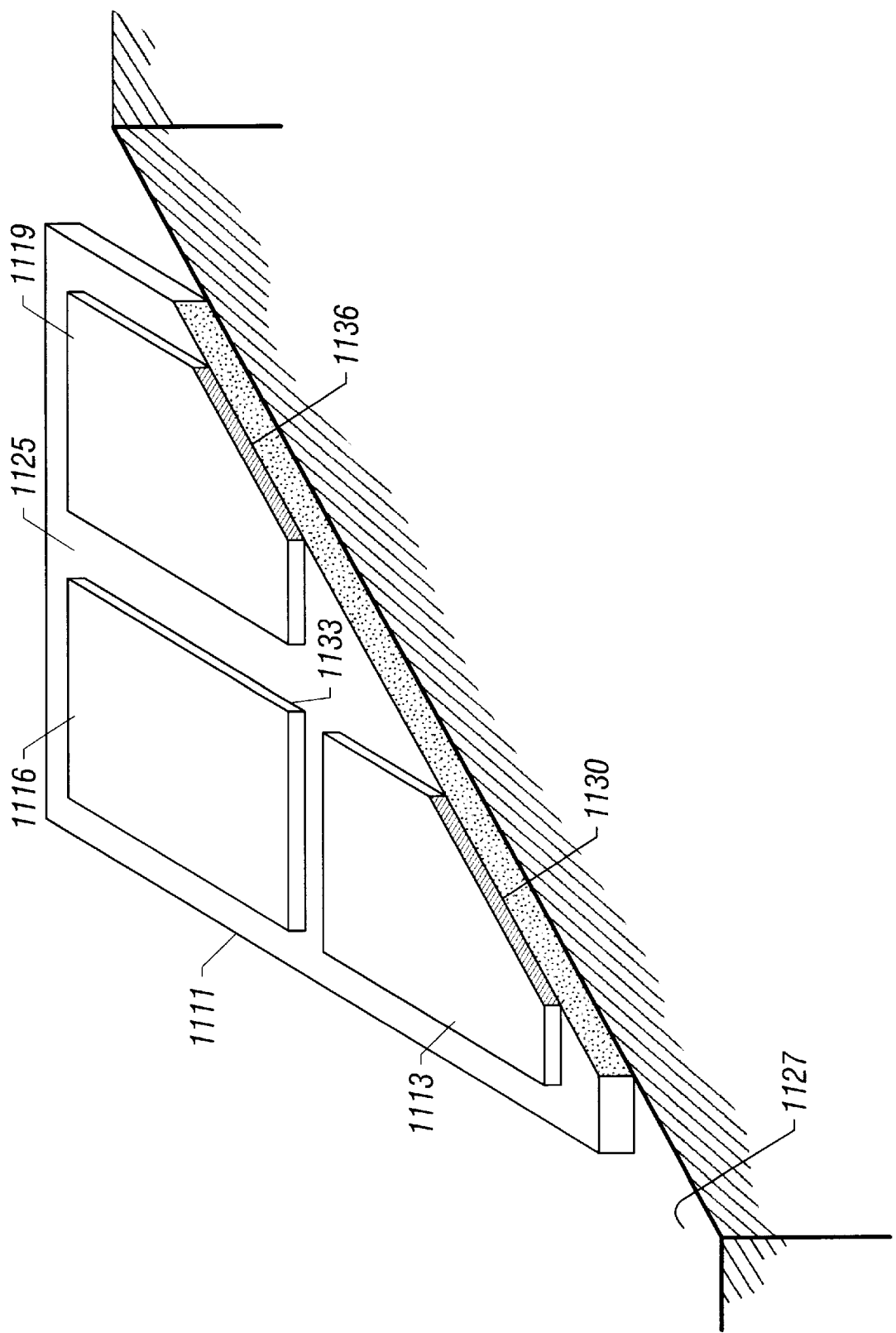
FIG. 11B is a partially sectional view of the Schottky-barrier strain gauge of FIG. 10B.

Turning now to FIGS. 11A and 11B, another embodiment of the device 1111 is shown to have three contacts 1113, 1116 and 1119 on a substrate leaf 1125, which is mounted on the surface 1127 of a strained component. The contacts are arranged in a right-triangular geometry such that contact 1116, located at the right angle of the triangle, is a common current sink or source to contacts 1113 and 1119, which are located at the legs of the triangle. Schottky barriers are formed at the interfaces 1130, 1133 and 1136 between metal contacts 1113, 1116 and 1119, and the substrate 1125, respectively. Thermionic current indicative of temperature flows approximately equally between each leg contact 1113, 1119 and the common contact 1116, respectively, because the temperature throughout the device 1111 is uniform.

Semiconductor substrate leaf 1125 preferably has a thickness of about 10 microns. Each metal contact 1113, 1116, and 1119 preferably has an area in the range of about 5,000 to 10,000 square microns, and is approximately 75 to 100 microns on a side, to provide sufficient area of contact with the substrate leaf to obtain a measurable alteration of the Schottky barrier with strain. Metal contacts 1113 and 1116 are preferably about 1–100 microns apart across the surface of the substrate leaf 1125, and metal contact 1119 is similarly spaced from metal contact 1116. Metal contacts 1113, 1116 and 1119 may each comprise one or more layers of metal, as described hereinabove with respect to the device shown in FIG. 1.

Figure 12:
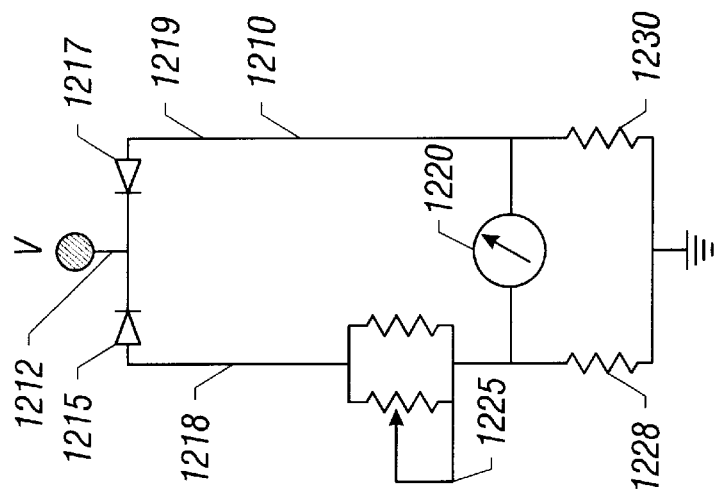
FIG. 12 is a schematic diagram of a Wheatstone bridge circuit incorporating the Schottky-barrier strain gauge of FIG. 10 or FIG. 11.

The device in FIGS. 11A and 11B is biased by a Wheatstone bridge circuit 1210, shown in FIG. 12. A Wheatstone bridge generally is a device well known to those skilled in the art. A lead 1212 is connected to metal contact 1116. Schottky diodes 1215 and 1217 comprise the current pathways of metal contact 1116 with metal contact 1113 and 1119, respectively. A lead 1218 is connected to metal contact 1113. A lead 1219 is connected to metal contact 1119. A detector 1220 monitors current or voltage in the bridge. A variable resistor 1225 is used to balance the bridge when the Schottky-barrier strain gauge 1111 of FIGS. 11A and 11B is in thermal equilibrium but not subject to stress, to compensate for any minor differences in thermionic emission current flowing in each of the respective Schottky diodes 1215 and 1217. Resistors 1228 and 1230 complete the Wheatstone bridge.

Stress applied to the component is transmitted throughout the surface 1127 to the device 1111. The dopant ion distribution is changed by strain in the lattice, resulting in both a polarization in the lattice and a migration of electrons to or from the metal contact. The Schottky barrier at each metal contact 1113, 1116 and 1119 is altered by the redistribution of dopant ions. The Schottky barrier at metal contact 1116 is forward biased, and therefore the effects on current flow at the Schottky barriers at metal contacts 1113 and 1119 predominate. The polarization caused by the strain gives rise to an electric field, the effect of which on the current flowing between metal contacts 1113 and 1116 is non-negligibly different from the effect it has on the current flowing between metal contacts 1119 and 1116. This difference is due to the directionality of the polarization in the lattice with respect to the direction of current flow in each Schottky diode 1215 and 1217. As a result, the Wheatstone bridge, which is balanced for thermal currents, becomes unbalanced due to the strain. Strain is indicated at the detector 1220, with temperature effects having already been removed by the arrangement of the Wheatstone bridge circuit.

Engines and transmissions in automobiles, helicopters, aircraft and machinery in general have lubricated sliding contacts in gears and bearings, in which it is desirable to monitor adverse temperatures and pressures. Such conditions may arise as lubricants break down during operation, and friction in sliding contacts increases beyond control. All of these systems can benefit tremendously from the incorporation of embedded sensors based on the device of the present invention. The signals from these sensors can be electronically processed, digitized and analyzed in a computer to provide a measure of system worthiness during field operation.

Figure 8:
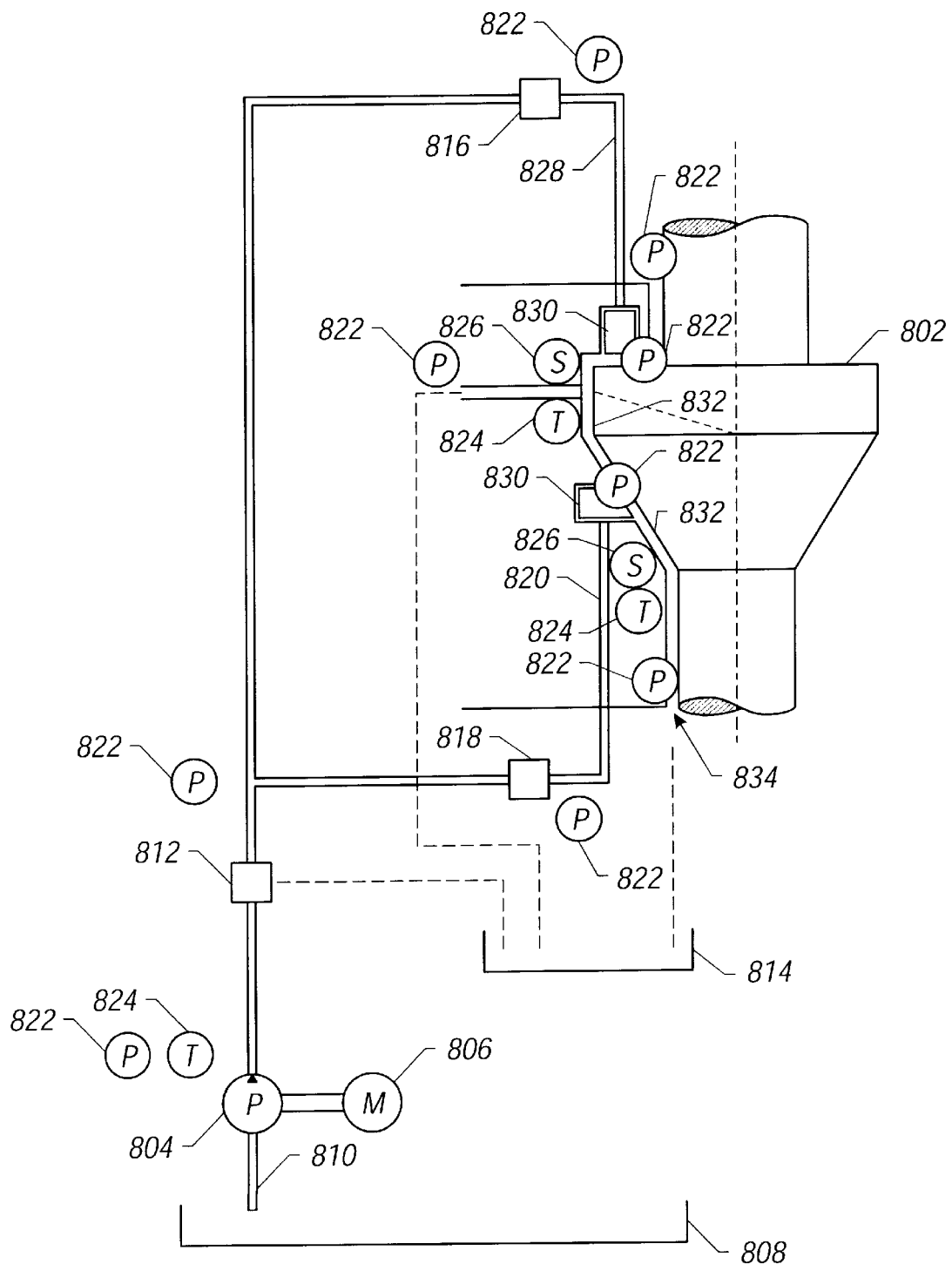
FIG. 8 is a diagrammatic view of a use of embodiments of the device of the present invention in an application.

By way of example, FIG. 8 depicts the use of sensors of the present invention in an opposed-pad conical bearing 802, along with the hydraulic system required for bearing operation. The hydraulic fluid is pumped by a pump 804, driven by a motor 806, from a main reservoir 808 through an intake line 810 where a constant pressure is maintained by a relief pressure valve 812. Excess fluid from the line is drained into a second reservoir 814. The fluid arrives through restrictors 816, 818, to the pads in the bearing. The spent fluid passes through drainage grooves 820 in the bearing into the second reservoir 814 where it is filtered and recirculated to the main reservoir. Sensors for pressure 822, temperature 824, and stress 826 are shown, respectively placed at locations such as the pump 804, inlet line 828, valve 812, restrictors 816, 818, pads 830, sliding surfaces 832 and outlets 834. The information is supplied to a computer that evaluates the operation and the condition of the bearing.

Temperature sensors according to the present invention may be included in the fabrication process for integrated circuits at an early stage of the fabrication, and serve as temperature sensors for the remainder of the fabrication process, by depositing two nickel or other suitable metal contacts on a suitably-doped region of the silicon wafer upon which fabrication is taking place. The contacts are then connected as described above to a voltage bias and a current meter. Local sensing of temperature during fabrication can improve the quality and yield of the process.

It may be seen that the semiconductor device of the present invention allows for improved strain and temperature measurement systems. The device has dimensions which make it ideal for embedding or attaching to multiple locations in an engine or other machinery, and furthermore the small dimensions of the device permit almost instantaneous stabilization of response. The devices are cost-effective to manufacturer, requiring only a few simple semiconductor fabrication steps.

While the invention has been described above in specific embodiments, the scope of the invention is not intended to be limited thereto, and it should be understood that other embodiments of the device and methods for its use lie within the scope of the invention, as defined by the claims.

What is claimed is:

1. A Schottky-barrier semiconductor strain gauge for providing an electrical indication of mechanical strain comprising:

a flexible doped semiconductor leaf having an upper surface and a lower surface, and having a thickness as measured from said upper surface to said lower surface of about 10 microns;

a first metal contact forming a first Schottky-type electrical barrier with said flexible doped semiconductor leaf over a first area of the upper surface, wherein the first Schottky-type electrical barrier changes as a piezoelectric effect created in response to strain applied to said doped semiconductor leaf; and a second metal contact forming a second Schottky-type electrical barrier with said doped semiconductor leaf over a second area of the upper surface, where the second Schottky-type electrical barrier changes as a piezoelectric effect created in response to strain applied to the strain gauge.

2. A Schottky-barrier semiconductor strain gauge according to claim 1, wherein the first area of the upper surface over which said first metal contact forms the first Schottky-type electrical barrier with said leaf is in the range of about 5,000 square microns to about 10,000 square microns.

3. A Schottky-barrier semiconductor strain gauge according to claim 1, wherein said doped semiconductor leaf comprises an n-type doped semiconductor.

4. A Schottky-barrier semiconductor strain gauge according to claim 1, wherein said doped semiconductor leaf has a dopant concentration of about $10^{15}$ dopant atoms per cubic centimeter.

5. A Schottky-barrier semiconductor strain gauge according to claim 1, wherein said doped semiconductor leaf comprises silicon.

6. A Schottky-barrier semiconductor strain gauge according to claim 1, wherein said first metal contact comprises a layer of nickel in contact with said doped semiconductor leaf and having a thickness of about 30 nanometers.

7. A Schottky-barrier semiconductor strain gauge according to claim 1, said first and second metal contacts being laterally separated across the upper surface of said doped semiconductor leaf by a distance in the range of 1 to 100 microns.

8. A Schottky-barrier semiconductor strain gauge according to claim 7, wherein said first and second metal contacts are laterally separated across the upper surface of said doped semiconductor leaf by a distance of about 10 microns.

9. A Schottky-barrier semiconductor strain gauge according to claim 1, wherein in response to an electrical bias said first and second metal contacts generate a current which is responsive to strain applied to said doped semiconductor leaf.

10. A Schottky-barrier semiconductor strain gauge according to claim 1, wherein the lower surface of said doped semiconductor leaf is polished.

11. A Schottky-barrier semiconductor strain gauge according to claim 6, wherein said first metal contact further comprises a chromium layer over said nickel layer and having a thickness of about 30 nanometers.

12. A Schottky-barrier semiconductor strain gauge according to claim 11, wherein said first metal contact further comprises a gold layer over said chromium layer and having a thickness of about 200 nanometers.

13. A Schottky-barrier semiconductor strain gauge according to claim 1, further comprising a layer of epoxy covering at least part of said doped semiconductor leaf.

14. A Schottky-barrier semiconductor strain gauge according to claim 1, further comprising a voltage responsive circuit having a first input electrically connected to said first metal contact, and having a second input electrically connected to said doped semiconductor leaf.

15. A Schottky-barrier semiconductor strain gauge according to claim 1, further comprising:

a source of electrical bias across the Schottky-type electrical barrier; and a current responsive circuit electrically connected in series between said first metal contact and said source of electrical bias to provide an output indicative of the strain.

16. A Schottky-barrier semiconductor strain gauge according to claim 15, further comprising:

a temperature responsive device for generating a signal indicative of the ambient temperature near said doped semiconductor leaf; and a circuit responsive to said output indicative of strain and to said signal indicative of ambient temperature for producing a temperature-corrected indication of current through the Schottky-type electrical barrier.

17. A Schottky-barrier semiconductor strain gauge for providing an electrical indication of mechanical strain within a member, comprising:

a first flexible doped semiconductor leaf located on a surface of the member;

a first metal contact interfacing with an upper surface of said first leaf, forming a Schottky-type electrical barrier at the interface therebetween;

a second metal contact interfacing with the upper surface of said first leaf, forming a Schottky-type electrical barrier at the interface therebetween, located at a distance across the upper surface of said first leaf so as to define a first vector from said first metal contact to said second metal contact;

a second flexible doped semiconductor leaf located on the surface of the member;

a third metal contact interfacing with an upper surface of said second leaf, forming a Schottky-type electrical barrier at the interface therebetween; and a fourth metal contact interfacing with the upper surface of said second leaf, forming a Schottky-type electrical barrier at the interface therebetween, located at a distance across the upper surface of said second leaf so as to define a second vector from said third metal contact to said fourth metal contact;

wherein said first leaf and said second leaf are arranged on the surface of the member such that said first vector and said second vector are substantially orthogonal.

18. A Schottky-barrier semiconductor strain gauge according to claim 17, wherein said first flexible doped semiconductor leaf has a crystal lattice structure which is orthogonal in orientation to the crystal lattice structure of said second flexible doped semiconductor leaf.

19. A Schottky-barrier semiconductor strain gauge according to claim 17, wherein the area of the upper surface of said first flexible doped semiconductor leaf over which said first metal contact forms a Schottky-type electrical barrier with said leaf is in the range of about 5,000 square microns to about 10,000 square microns.

20. A Schottky-barrier semiconductor strain gauge according to claim 19, wherein said first flexible doped semiconductor leaf comprises an n-type doped semiconductor.

21. A Schottky-barrier semiconductor strain gauge according to claim 20, wherein said first flexible doped semiconductor leaf is about 10 microns thick.

22. A Schottky-barrier semiconductor strain gauge according to claim 21, wherein said first flexible doped semiconductor leaf has a dopant concentration of about $10^{15}$ dopant atoms per cubic centimeter.

23. A Schottky-barrier semiconductor strain gauge according to claim 22, wherein said first and second metal contacts are laterally separated across the upper surface of said first flexible doped semiconductor leaf by a distance in the range of 1 to 100 microns.

24. A Schottky-barrier semiconductor strain gauge for providing an electrical indication of mechanical strain, comprising:

a flexible doped semiconductor leaf;

a first metal contact interfacing with an upper surface of said leaf, forming a Schottky-type electrical barrier at the interface therebetween;

a second metal contact interfacing with the upper surface of said leaf, forming a Schottky-type electrical barrier at the interface therebetween, located at a distance across the upper surface of said leaf so as to define a first vector from said first metal contact to said second metal contact; and a third metal contact interfacing with the upper surface of said leaf, forming a Schottky-type electrical barrier at the interface therebetween, located at a distance across the upper surface of said leaf so as to define a second vector from said first metal contact to said third metal contact;

wherein said first vector and said second vector are substantially orthogonal.

25. A Schottky-barrier semiconductor strain gauge according to claim 24, wherein the area of the upper surface of said flexible doped semiconductor leaf over which at least one of the set of said first, second and third metal contacts forms a Schottky-type electrical barrier with said leaf is in the range of about 5,000 square microns to about 10,000 square microns.

26. A Schottky-barrier semiconductor strain gauge according to claim 25, wherein said flexible doped semiconductor leaf comprises an n-type doped semiconductor.

27. A Schottky-barrier semiconductor strain gauge according to claim 26, wherein said flexible doped semiconductor leaf is about 10 microns thick.

28. A Schottky-barrier semiconductor strain gauge according to claim 27, wherein said flexible doped semiconductor leaf has a dopant concentration of about $10^{15}$ dopant atoms per cubic centimeter.

29. A Schottky-barrier semiconductor strain gauge according to claim 28, wherein said first and second metal contacts are laterally separated across the upper surface of said flexible doped semiconductor leaf by a distance in the range of 1 to 100 microns, and said first and third metal contacts are laterally separated across the upper surface of said flexible doped semiconductor leaf by the same distance as separates said first and second metal contacts.

30. A Schottky-barrier semiconductor strain gauge according to claim 24, further comprising:

a source of electrical bias, having a first bias pin and a second bias pin;

a first lead disposed to provide a conductive pathway between said first metal contact and said first bias pin;

a first resistance element providing a conductive pathway between said second metal contact and said second bias pin;

a second resistance element providing a conductive pathway between said third metal contact and said second bias pin; and a current monitor electrically connected between said second and third metal contacts.

31. A Schottky-barrier semiconductor strain gauge for providing an electrical indication of mechanical strain comprising:

a flexible doped semiconductor leaf having an upper surface and a lower surface, and having a thickness as measured from said upper surface to said lower surface of about 10 microns;

a first metal contact forming a first Schottky-type electrical barrier with said flexible doped semiconductor leaf over a first area of the upper surface, wherein the first Schottky-type electrical barrier changes as a piezoelectric effect created in response to strain applied to said doped semiconductor leaf;

a source of electrical bias across the Schottky-type electrical barrier;

a current responsive circuit electrically connected in series between said first metal contact and said source of electrical bias to provide an output indicative of the strain;

a temperature responsive device for generating a signal indicative of the ambient temperature near said doped semiconductor leaf; and a circuit responsive to said output indicative of strain and to said signal indicative of ambient temperature for producing a temperature-corrected indication of current through the Schottky-type electrical barrier.

* * * * *

UNITED STATES PATENT AND TRADEMARK OFFICE
CERTIFICATE OF CORRECTION

PATENT NO. : 6,034,404
DATED : MARCH 7, 2000
INVENTOR(S) : SCHUBERT F. SOARES

It is certified that error appears in the above-identified patent and that said Letters Patent is hereby corrected as shown below:

On page 1 of the specification, before line 1, insert --U.S. Government may have certain rights in this invention pursuant to ONR grant number N00014-95-C-0355--

Signed and Sealed this

Fifteenth Day of May, 2001

Attest:

NICHOLAS P. GODICI

Attesting Officer    Acting Director of the United States Patent and Trademark Office